(12) United States Patent
Wang et al.

(10) Patent No.: US 6,330,136 B1
(45) Date of Patent: Dec. 11, 2001

(54) MAGNETIC READ SENSOR WITH SDT TRI-LAYER AND METHOD FOR MAKING SAME

(75) Inventors: Lien-Chang Wang, Fremont, CA (US); Chih-Huang Lai, Hsinchu (TW); Tai Min, San Jose, CA (US); Zhupei Shi, San Jose, CA (US); Billy W. Crue, Jr., San Jose, CA (US)

(73) Assignee: Read-Rite Corporation, Fremont, CA (US)

(*) Notice: Subject to any disclaimer, the term of this patent is extended or adjusted under 35 U.S.C. 154(b) by 0 days.

(21) Appl. No.: 09/173,472

(22) Filed: Oct. 14, 1998

(51) Int. Cl.[7] ........................................ G11B 5/39
(52) U.S. Cl. ............................................... 360/324.2
(58) Field of Search ........................... 360/324.2, 324.1, 360/324.11, 324.12; 338/32 R; 324/252, 207.21

(56) References Cited

U.S. PATENT DOCUMENTS

| 5,390,061 | | 2/1995 | Nakatani et al. | |
|---|---|---|---|---|
| 5,629,922 | | 5/1997 | Moodera et al. | 369/126 |
| 5,729,410 | * | 3/1998 | Fontana, Jr. et al. | 360/324.2 |
| 5,986,858 | * | 11/1999 | Sato et al. | 360/324.2 |
| 6,023,395 | * | 2/2000 | Dill et al. | 360/324.2 |
| 6,072,382 | * | 6/2000 | Daughton et al. | 338/32 R |
| 6,087,027 | * | 7/2000 | Hoshiya et al. | 360/324.11 X |
| 6,097,579 | * | 8/2000 | Gill | 360/324.2 |

* cited by examiner

Primary Examiner—David L. Ometz
(74) Attorney, Agent, or Firm—Carr & Ferrell LLP; Robert D. Hayden; John S. Ferrell

(57) ABSTRACT

An Spin Dependent Tumelina SDT read sensor includes a first ferromagnetic (FM) layer and a second FM layer separated by an insulating layer. The first FM layer and second FM layer are substantially electrically isolated from each other. Specifically, the sidewalls of the SDT read sensor are substantially free of electrical paths between the first FM layer and the second FM layer. Also, a surface of the second FM layer that is substantially parallel to the air bearing surface, is recessed from the air bearing surface. A method for forming an SDT read sensor includes depositing a first FM material layer, depositing an intermediate insulation material layer over the first FM material layer, and then depositing a second FM material layer over the intermediate insulation material layer. The second FM material layer and the intermediate insulation material layer are etched, with the etching being stopped before the etching etches the first FM material layer.

6 Claims, 14 Drawing Sheets

MAGNETIC READ SENSOR WITH SDT TRI-LAYER AND METHOD FOR MAKING SAME

BACKGROUND OF THE INVENTION

This invention relates generally to magnetic disk drives, more particularly to magnetoresistive (MR) read heads, and most particularly to spin-dependent tunneling (SDT) read sensors and methods of making the same.

Magnetic disk drives are used to store and retrieve data for digital electronic apparatuses such as computers. In FIGS. 1A and 1B, a magnetic disk drive 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 typically includes an inductive write element with a sensor read element (shown in FIG. 1C). As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Various magnetic "tracks" of information can be read from the magnetic disk 16 as the actuator 18 causes the transducer 24 to pivot in a short arc as indicated by the arrows P. The design and manufacture of magnetic disk drives is well known to those skilled in the art.

FIG. 1C depicts a cross-sectional view of a magnetic read/write head 24 including a read element 32 and a write element 34, which is typically an inductive write element. Exposed edges of the read element 32 and the write element 34 define an air-bearing surface ABS, along a plane 35, which faces the surface of the magnetic disk 16.

Read element 32 includes a first shield SH1, an intermediate layer 39 which serves as a second shield SH2, and a read sensor 40 located between the first shield SH1 and the second shield SH2. Read elements commonly make use of a phenomenon termed the magnetoresistive effect (MRE), where the electrical resistance R of the read sensor 40 changes with exposure to an external magnetic field, such as magnetic fringing flux from magnetic disk 16. The incremental electrical resistance $\Delta R$ is detected by using a sense current that is passed through the read sensor 40 to measure the voltage across the read sensor 40. The precision and sensitivity of the read sensor in sensing the magnetic fringing flux increases as the ratio of $\Delta R/R$ increases. Also, larger resistances result in larger voltages measured across the read sensor 40 which, in turn, results in greater effectiveness of the read sensor. Thus, it is desirable to maximize both the output voltage and $\Delta R/R$.

Types of magnetoresistive effects utilized in the read sensor 40 include the anisotropic magnetoresistive (AMR) effect and the giant magnetoresistive (GMR) effect. A particular type of effect is the spin-dependent tunneling (SDT) effect, which can be used in an SDT sensor. A schematic of such an SDT sensor is illustrated by the read sensor 40 in FIG. 1D. As is shown, the SDT read sensor 40 can include a tri-layer, sometimes referred to as a tri-layer tunnel junction, having a first ferromagnetic (FM) layer FM1 and a second ferromagnetic layer FM2, which are separated by an insulating layer INS. These layers are oriented substantially parallel to the shields SH1 and SH2. Thus, when the sense current I is injected to the SDT read sensor 40 between the shields SH1 and SH2, the current can travel substantially perpendicular to the layers FM1, FM2, and INS. In other words, the SDT read sensor can operate in current perpendicular to plane (CPP) mode. Write element 34 includes an intermediate layer 39 that functions as a first pole (P1), and a second pole (P2) disposed above the first pole P1. P1 and P2 are physically and electrically attached to one another by a backgap portion (not shown) distal to the ABS. A write gap 46 is formed of an electrically insulating material between P1 and P2 proximate to the ABS. Also included in write element 34 in the space defined between P1 and P2 are conductive coils 48 disposed within an insulation layer 50.

In the SDT read sensor 40, the ferromagnetic layers FM1 and FM2 can act as electrodes between which the sense current I passes through the insulating layer INS, which is sometimes referred to as the tunnel barrier. The relative directions of the magnetizations M1 and M2 of the ferromagnetic layers FM1 and FM2, respectively, can be influenced by external magnetic fields, thereby changing the resistance of the SDT read sensor 40, which can be detected with the sense current I. More specifically, when the magnetization of one of the ferromagnetic layers is anti-parallel to that of the other ferromagnetic layer the SDT effect results in a higher resistance across the SDT read sensor, with a lower resistance being experienced when M1 and M2 are parallel to each other. Typically, SDT read sensors exhibit $\Delta R/R$ of up to 18–30% and output voltages higher than 10 mV, which is higher than that produced with many other types of MR read sensors. Thus, while advances in magnetic disk and drive technology are resulting in magnetic media that have increasingly higher area density, corresponding increasing read sensor performance needs can be met by the higher $\Delta R/R$ and higher output voltages of SDT read sensors.

The SDT read sensor 40 can be formed by successive deposition over a first lead (here the first shield SH1) of different materials to form the first FM layer FM1, the insulating layer INS, and the second FM layer FM2. Because the SDT read sensor is operated in CPP mode, the $\Delta R/R$ is particularly sensitive to the interfaces between the layers of the SDT read sensor (interlayer interfaces). To provide interlayer interfaces with minimal pin holes and impurities, and therefore higher $\Delta R/R$, FM1, FM2, and INS can be successively deposited in a one-pump-down process.

The sensor layers 42 are then etched using typical processes to form the FM1, FM2, and INS, over which a second lead, here the second shield SH2, is deposited. Such etching is needed to provide suitable read sensor dimension control to meet increasingly high magnetic media area densities. Unfortunately, if the etching is performed after all three materials have been deposited in a one-pump-down process, material which has been etched away from one of the three layers can redeposit on the exposed remaining portions of the other layers (along the sidewalls 41). This can often result in the redeposition of portions of the first and/or second ferromagnetic layers such that an undesirable electrical path, or short circuit, is formed between FM1 and FM2 along the sidewalls 41. With such a short circuit path, the SDT sensor 40 may not effectively produce the spin-dependent tunneling phenomenon, and therefore exhibits reduced sensor effectiveness. Theoretically, short circuits could be minimized through the use of complex, expensive, and/or time-consuming processes to limit such redeposition, however, this would not be cost-effective for commercial production of SDT read sensors.

Later in the fabrication process, the layers of the SDT sensor 40 are lapped substantially perpendicularly to the sensor layers 42 to form the air bearing surface ABS. Unfortunately, during this process, material from a facing (or front) surface (or edge) of one of the various layers can be smeared over the other layers. If the material from FM1 and/or FM2 is smeared between the two layers, such material can also form an undesirable short circuit path between them. Further, as the read sensor 40 thickness H becomes increasingly smaller, to accommodate higher area densities, FM1 and FM2 may become closer together, thereby increasing the likelihood of smearing between them. As can be understood by those skilled in the art, the problems of edge redeposition and smearing, and their concomitant reductions in read performance, can also be encountered in the fabrication of other read sensors that operate in CPP mode.

Therefore, to provide the benefits of the spin-dependent tunneling effect in a read sensor, a read sensor and a method for making the same are desired which have a high degree of interlayer interface control while avoiding the formation of short circuit paths between conductive layers of the read sensor. Also, it is desired that such a read sensor be fabricated less expensively and more quickly while using current read sensor process technologies. Further, to meet increasingly higher magnetic media area density, such a read sensor is desired to be fabricated with a high degree of read sensor dimension control.

SUMMARY OF THE INVENTION

The present invention provides an SDT read sensor and method for making the same that provides higher performance while simultaneously utilizing less costly and less complex fabrication processes. This is accomplished by providing an SDT read sensor having substantially no short circuit paths between the two ferromagnetic layers, and that is formed by a method that involves simple and few operations.

According to an embodiment of the present invention, a tri-layer magnetoresistive effect sensor includes a first active layer, a second active layer, and an intermediate layer located between the first active layer and the second active layer. Advantageously, the first active layer is substantially electrically isolated from the second active layer, thus substantially avoiding an electrical short circuit between the first active layer and the second active layer. In a particular embodiment, the first active layer has a first interface surface defined by a first width, the second active layer has a second interface surface defined by a second width that is smaller than the first width, and the intermediate layer has a third interface surface that is proximate the first interface surface and that is defined by a third width that is substantially equal to the first width. Further, the intermediate layer has a fourth interface surface that is proximate the second interface surface and that is defined by a fourth width that is substantially equal to the second width.

In another embodiment of the present invention, a system for reading from and writing to magnetic media includes a read/write head including a write element for writing data to the magnetic media, and a tri-layer magnetoresistive effect (MRE) sensor, as described above, that is coupled with the write element and used for reading data from the magnetic media. In such a system, the tri-layer MRE sensor provides greater precision and sensitivity in reading data. In a particular aspect of the invention, a first active layer facing surface and an intermediate layer facing surface of the tri-layer MRE sensor are substantially in a same plane that provides an air bearing surface, while a second active layer facing surface lies in a different plane.

In yet another embodiment of the present invention, a method for forming a magnetoresistive effect (MRE) device includes forming a first lead, forming an MRE sensor electrically coupled with the first lead, and a second lead that is electrically coupled with the MRE sensor. The MRE sensor includes a first active layer having a first outer surface that is electrically coupled with and substantially parallel to the first lead, and a second active layer having a second outer surface that is electrically coupled with and substantially parallel to the second lead and that is separated from the first active layer by an intermediate layer. In addition, a width of the first active layer is greater than a width of the second active layer. Further, an electrical path exists between the first lead and second lead, that travels substantially perpendicularly through the first active layer, intermediate layer, and second active layer. Preferably, the forming of the MRE sensor includes depositing a first material layer, depositing an intermediate material layer over the first material layer, and then depositing a second material layer over the intermediate material layer. The second material layer and the intermediate material layer are etched, with the etching being stopped before the etching etches the first material layer.

The various embodiments of the present invention enable the reading of magnetic media at higher performance levels. Further, these advantages are gained while maintaining low manufacturing time, cost, and complexity. More specifically, the various embodiments of the present invention provide for a CPP mode read sensor having submicron geometries that can be formed quickly and inexpensively. Even more specifically, a SDT read sensor is provided by the various embodiments of the present invention. In some embodiments, a method for forming the read sensor results in substantially no undesirable shorting between layers of the read sensor.

These and other advantages of the present invention will become apparent to those skilled in the art upon a reading of the following descriptions of the invention and a study of the several figures of the drawing.

DETAILED DESCRIPTION OF THE PREFERRED EMBODIMENTS

Figure 1A:
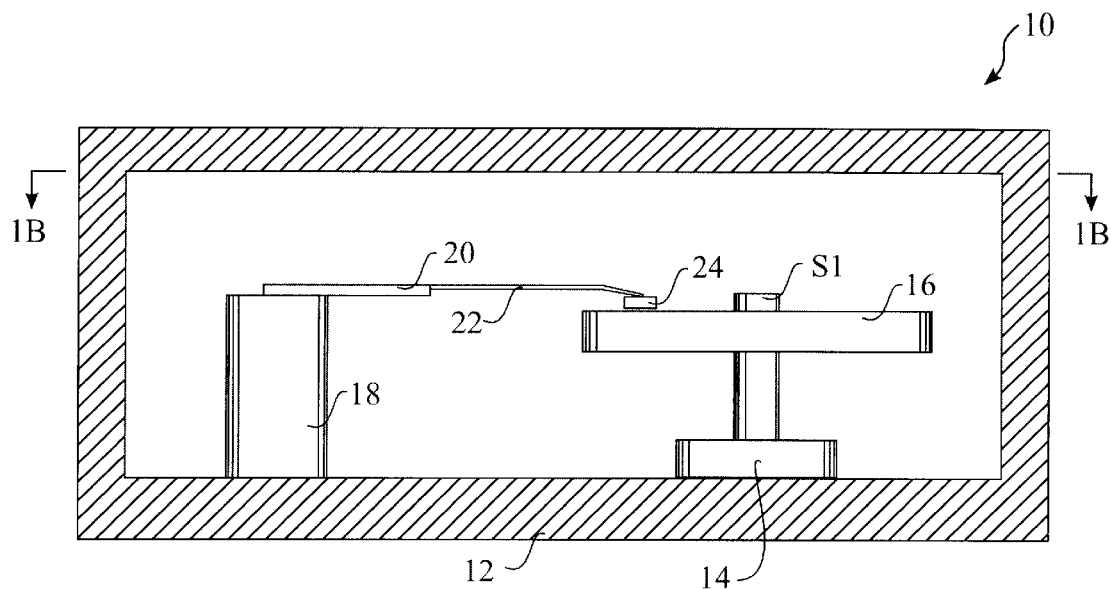
FIG. 1A is a partial cross-sectional front elevation view of a magnetic disk drive assembly.

FIGS. 1A–1D were described previously in a discussion of the prior art. FIG. 2A depicts a flowchart of a fabrication method 50 for forming an SDT sensor according to an embodiment of the present invention. After providing a substrate in operation 52, a first shield is formed on the substrate in operation 54. While other materials can be used, the substrate can be formed of Si, while the first shield is formed of NiFe, for example. The first shield can be formed in operation 54 through any appropriate method known to those skilled in the art, such as plating, or film deposition followed by etching in the form of ion milling, for example.

In operation 56, an undercoat layer is formed over the substrate by first depositing electrically insulating material over the substrate and the first shield. The undercoat layer can be formed of materials such as $Al_2O_3$, AlN, or $SiO_2$. The undercoat layer is then preferably planarized through a known process such as chemical-mechanical polishing (CMP), exposing the first shield in the process. A first lead is formed above the first shield in operation 58. This first lead can be formed of a suitable conductive material, such as Au, Cu, or Ta, among others. While various processes can be used to form the first lead, in one process a layer of lead material is deposited over the first shield and undercoat layer. The lead material is then etched to form the first lead using known methods such as ion milling in conjunction with a patterned photoresist layer. Alternatively, with appropriate modification of the below-described operations, the first shield can operate as a lead, without the addition of the first lead.

In operation 60, a connecting lead is formed along with an MRE sensor having a first active layer and a second active layer that are substantially electrically isolated from each other except through an intermediate layer between the two. In operation 62, a second shield is formed over the second active layer. Among other appropriate methods, the second shield can be formed by depositing shield material over the MRE sensor and then etching the shield material with a known process such as ion milling with a patterned photoresist mask. A sensing contact is formed in operation 64, and is electrically connected to the first shield while being electrically isolated from the second shield. In operation 66 the first active layer is lapped.

Figure 2A:
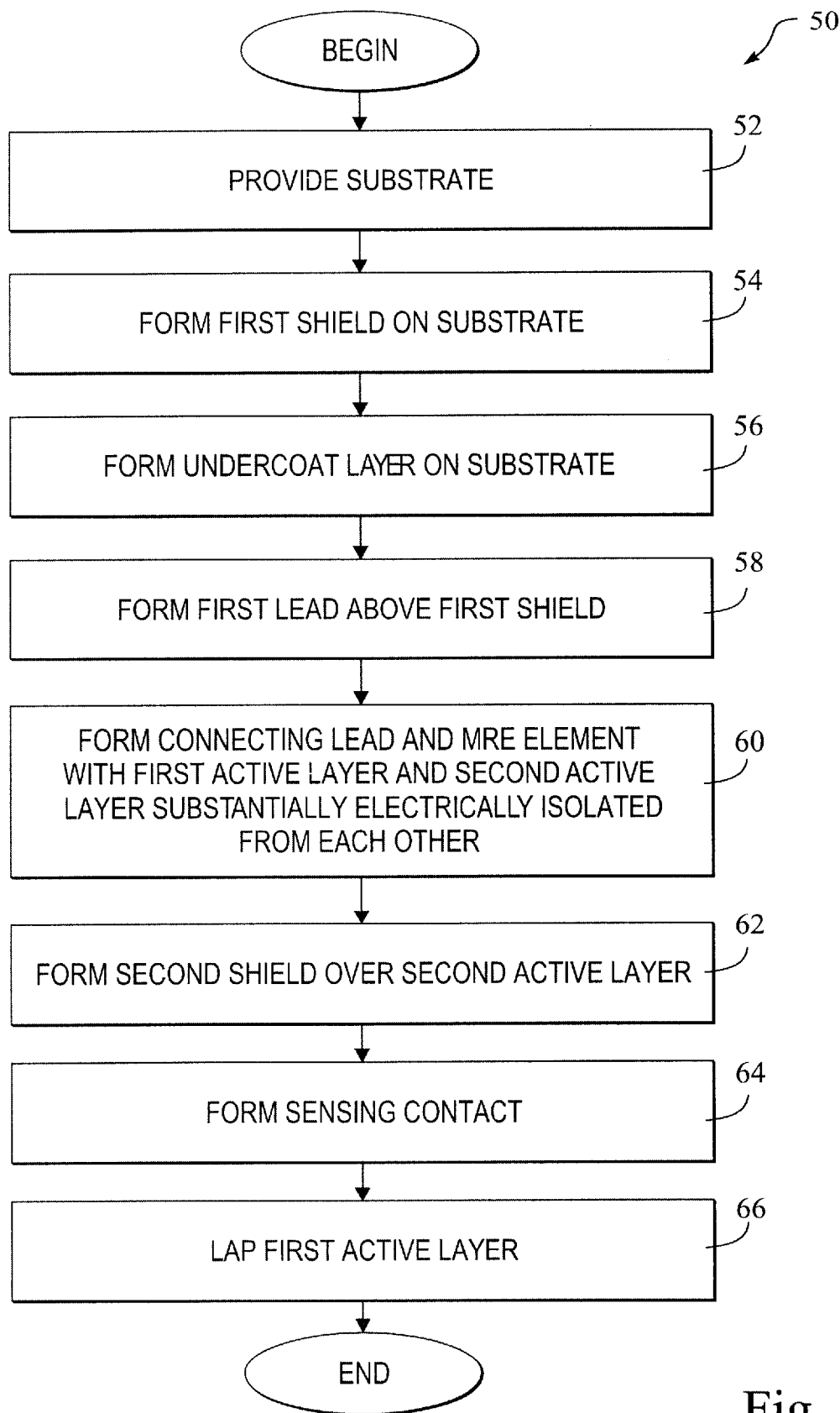
FIG. 2A is a flow chart of a method of forming an SDT read sensor, according to an embodiment of the present invention.
Figure 2B:
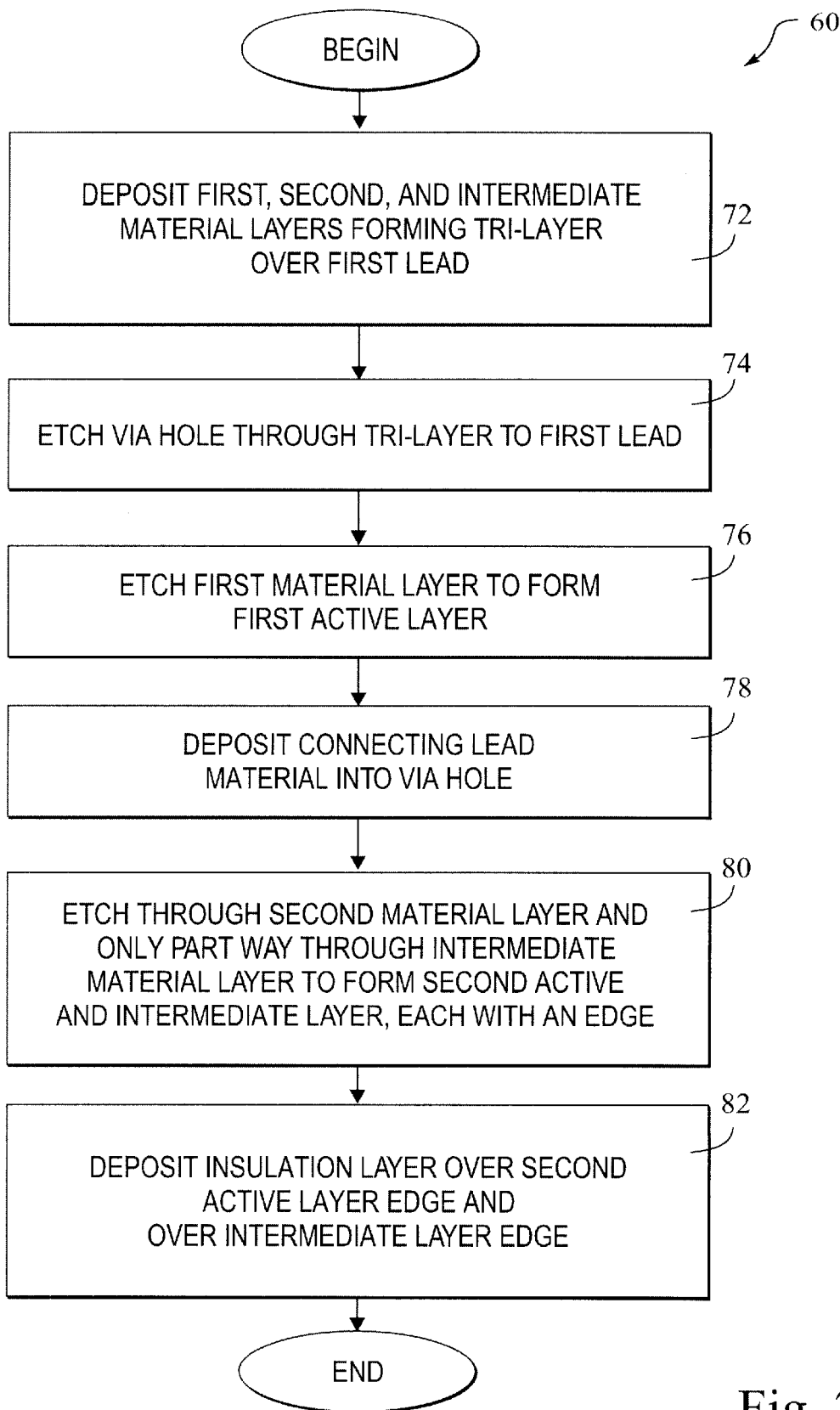
FIG. 2B is a flow chart of the operation of forming an intermediate multi-layer construction shown in FIG. 2A, according to an embodiment of the present invention.
Figure 3A:
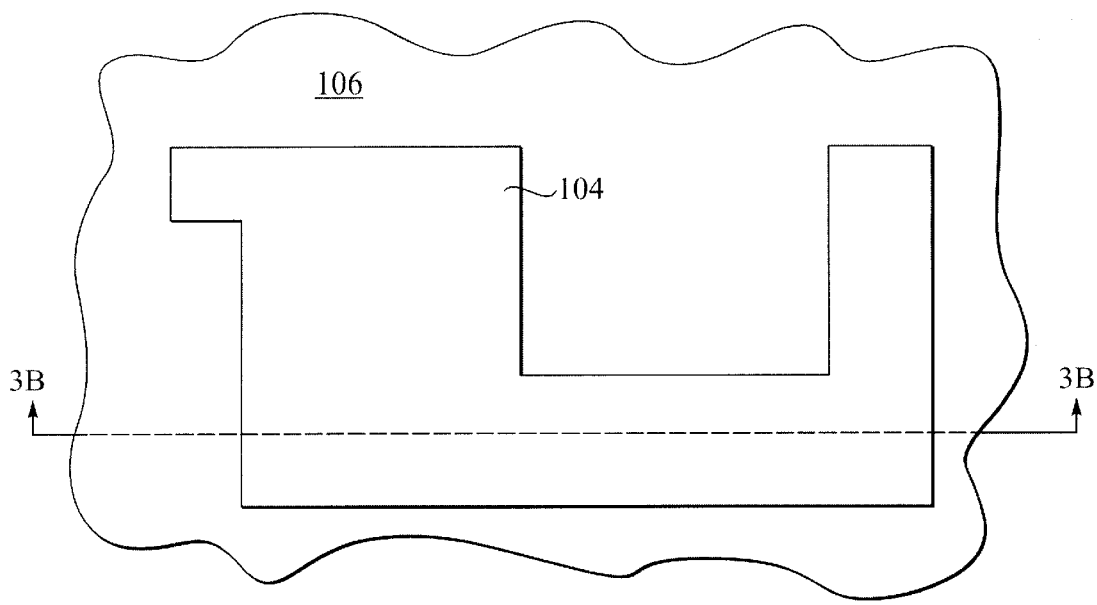
FIGS. 3A, 4A, 5A, 6A, 7A, 8A, 9A, 10A, and 11A are plan views of a partially fabricated SDT read sensor at various stages of fabrication, according to an embodiment of the present invention
Figure 3B:
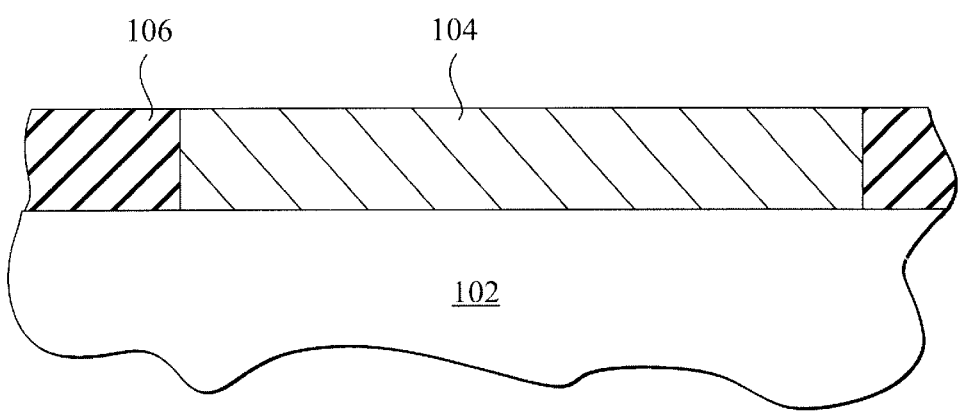
FIGS. 3B, 4B, 5B, 6B, 7B, 8B, 9B, 10B, and 11B are cross-sectional views of the partially fabricated SDT read sensor of FIGS. 3A, 4A, 5A, 6A, 7A, 8A, 9A, 10A, and 11A, respectively, according to an embodiment of the present invention.

The formation of the connecting lead and MRE sensor in operation 60 of FIG. 2A is further detailed in FIG. 2B. In operation 72, first, second, and intermediate material layers are deposited over the first lead to form a tri-layer. Although this deposition can be performed in various suitable known methods, it is preferable that all three layers be deposited in a one-pump-down process known to those with skill in the art. Using such a process enhances the interlayer interfaces between the three layers by, for example, minimizing the inclusion of impurities or pin holes in the interfaces. Such a process is preferable because the magnetoresistive ratio ($\Delta R/R$), and therefore overall performance, of the CPP read sensor is particularly sensitive to these interlayer interfaces.

To produce a spin-dependent tunneling phenomenon, the first and second material layers are ferromagnetic, while the intermediate material layer is formed of an electrically insulating material. For example, the first and second material layers can be formed of NiFe, CoFe, Co, Fe, or other ferromagnetic materials, while the intermediate material layer can be formed of $Al_2O_3$, AlN, BN, NiO, Si, SiC, or other insulating materials. Also, while the first and second material layers are in the range of about 1000 angstroms to about 20,000 angstroms thick, the intermediate layer thickness is in the range of about 10 angstroms to about 20 angstroms.

A via hole is etched through the tri-layer to the first lead in operation 74. The via hole can be etched in any appropriate known method such as ion milling through a patterned photoresist layer. However, preferably, the via hole can be etched using ion milling through a bi-layer resist structure that is appropriately patterned to achieve a desired via hole shape. Another via hole also can be etched through the tri-layer to the first lead, in this or a separate operation, at some distance away from the first via hole. In operation 76, the first material layer is etched to form a first active layer with an edge. The etching of operation 76 can be performed at the same time as the etching of operation 74. During operation 76, the second and intermediate material layers can also be etched, thereby exposing edges of the second and intermediate material layers which, together with the first active layer edge, form a sidewall. Redeposition can occur during the etchings, such that the first material layer and second material layer are electrically connected along the sidewall. Connecting lead material is deposited into the via hole in operation 78. This material can be formed of various suitable conductive materials. In addition, hard bias materials, such as high-coercivity CoCrPt, can be used to additionally provide biasing of the read sensor layers.

In operation 80, the second material layer is etched so as to form a second active layer with an edge, while the intermediate material layer is etched only part way through a total thickness of the intermediate material layer, thereby forming an intermediate layer having an edge. This etching removes material at the edges of the second active layer and the intermediate layer such that there is substantially no electrical connection between the first active layer and the second active layer at the sidewall. Operation 82 includes depositing an insulation layer over the second active layer edge and over the intermediate layer edge. In this way, while electric current can pass between the first active layer and the second active layer through the intermediate layer, the second active layer is substantially electrically isolated from the first active layer, or, in other words, there is substantially no short circuit path between them.

FIGS. 3 through 11 depict an SDT sensor in accordance with an embodiment of the present invention at various stages of fabrication, using a method according to an embodiment of the present invention. FIG. 3A and FIG. 3B depict a plan view and cross-sectional view, respectively, of a substrate 102 covered by a first shield 104 and a planarized undercoat layer 106. The substrate 102 can be formed of any appropriate non-conductive material such as silicon oxide. The first shield 104 is formed of any appropriate magnetic material such as NiFe. The first shield 104 can be defined by any known process such as applying a patterned photoresist layer over the substrate 102 and then plating the first shield material onto the substrate 102. Alternatively, a first shield material can be sputtered onto the substrate 102 and then etched using ion milling. The undercoat layer 106 is formed by depositing undercoat material, such as $Al_2O_3$, $SiO_2$, or other appropriate insulating material, and then planarizing the undercoat material to expose the first shield 104. The planarization of the undercoat material can be achieved using CMP processes, or other appropriate processes known in the arts.

Figure 4A:
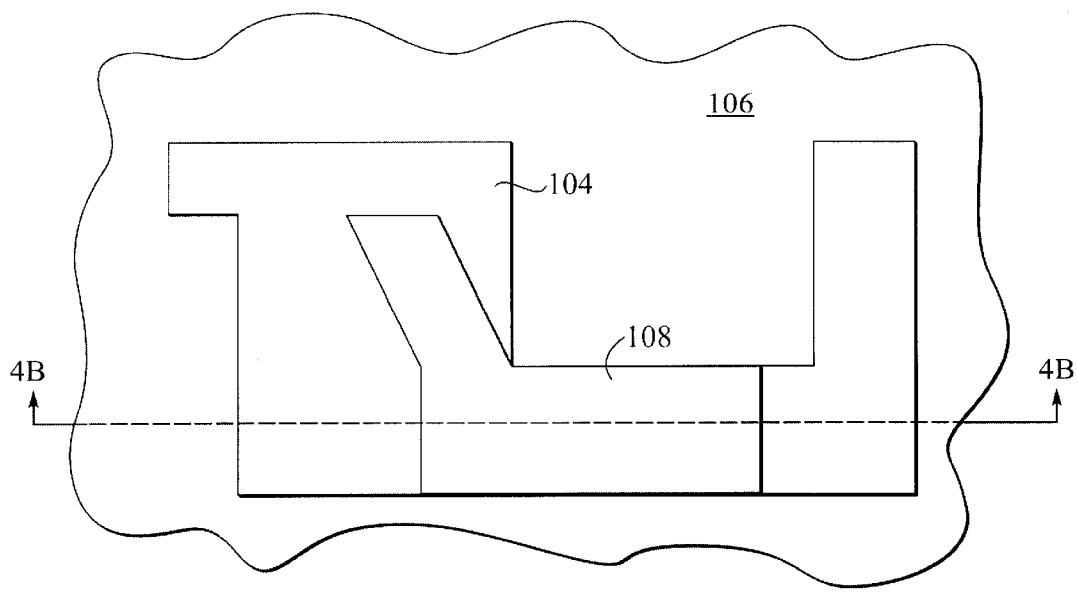
Figure 4B:
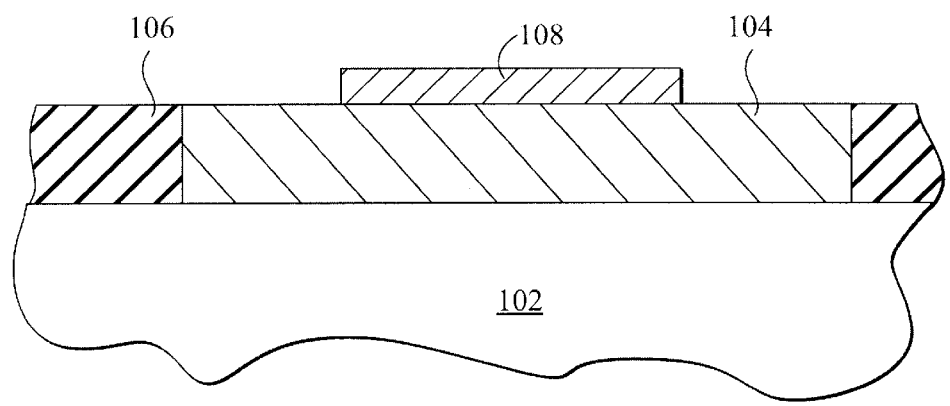
Figure 5A:
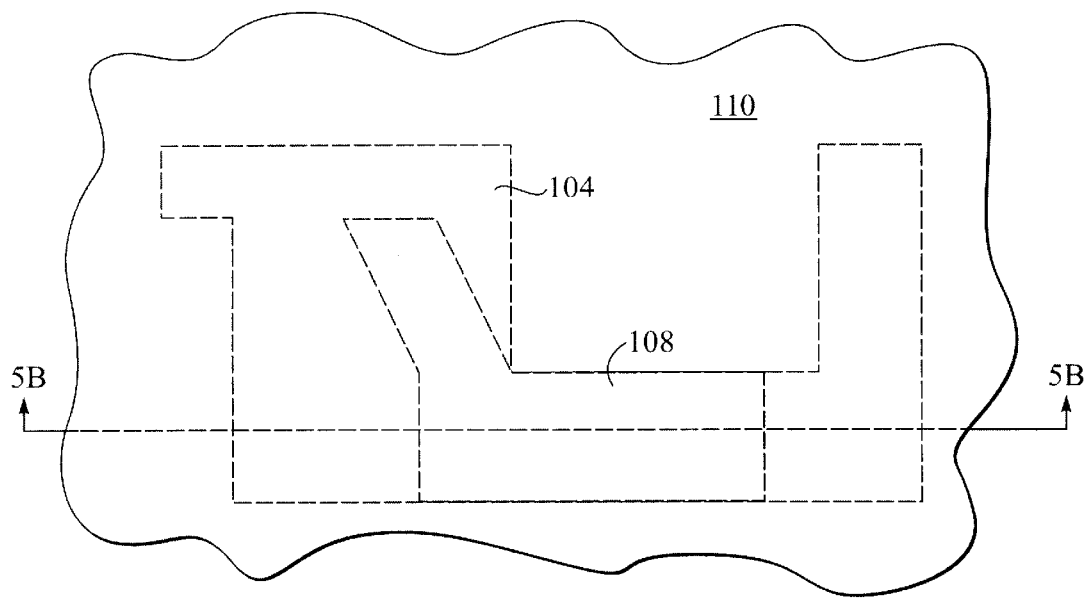
Figure 5B:
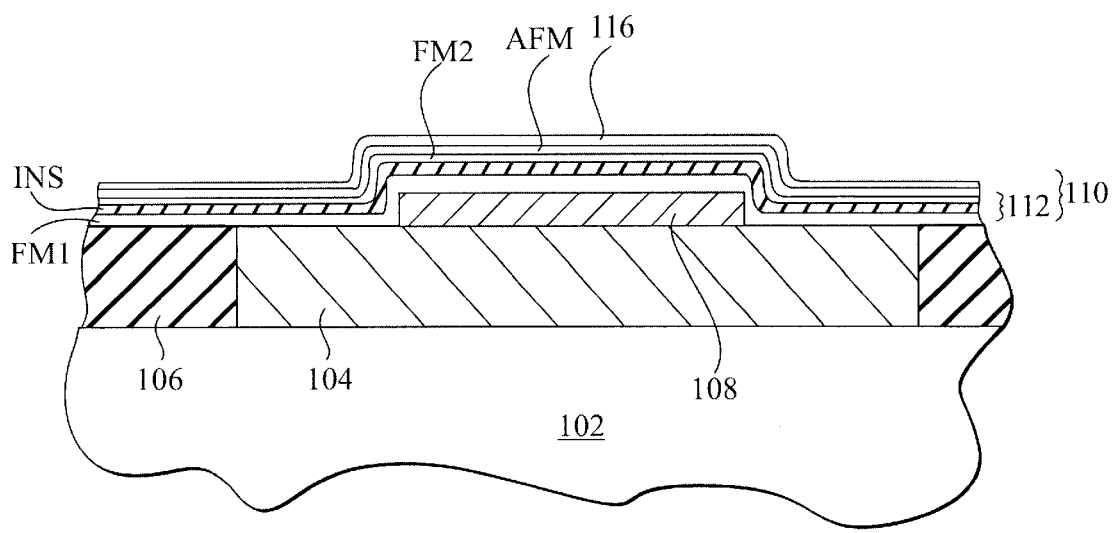

FIGS. 4A and 4B depict, in plan and cross-sectional views, respectively, a first lead 108 formed over the first shield 104. The first lead 108 can be formed of suitable conductive material such as gold (Au), copper (Cu), or tantalum (Ta). Further, the first lead 108 can be defined by the deposition of a full film of the lead material followed by etching such as ion milling. FIGS. 5A and 5B show a spin-dependent tunneling (SDT) multilayer 110 overlying the first shield 104, the planarized undercoat layer 106, and the first lead 108. As depicted in FIG. 5B, the SDT multilayer 110 includes an SDT tri-layer 112, above which an anti-ferromagnetic (AFM) layer 114, and a capping layer 116 lie. The SDT tri-layer 112 includes a first magnetic layer, FM1 in contact with the planarized undercoat layer 106, the first shield 104, and the first lead 108. In addition, the SDT tri-layer 112 includes a second ferromagnetic layer FM2, which is separated from the first ferromagnetic layer FM1 by an insulation layer, INS. In such a configuration, the AFM layer functions to pin the magnetization of the second ferromagnetic layer FM2, which is, therefore, a pinned layer. While other processes can be used, preferably the SDT multilayer layers are sputter deposited in a one-pump-down fashion without breaking the vacuum. Such deposition can produce preferable interlayer interfaces.

Figure 6A:
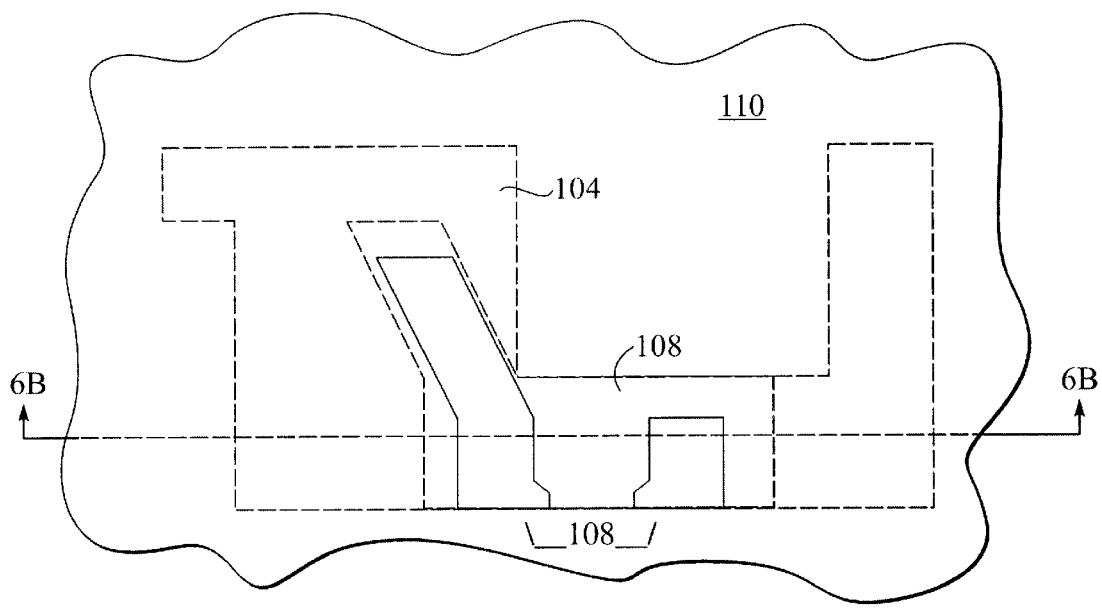
Figure 6B:
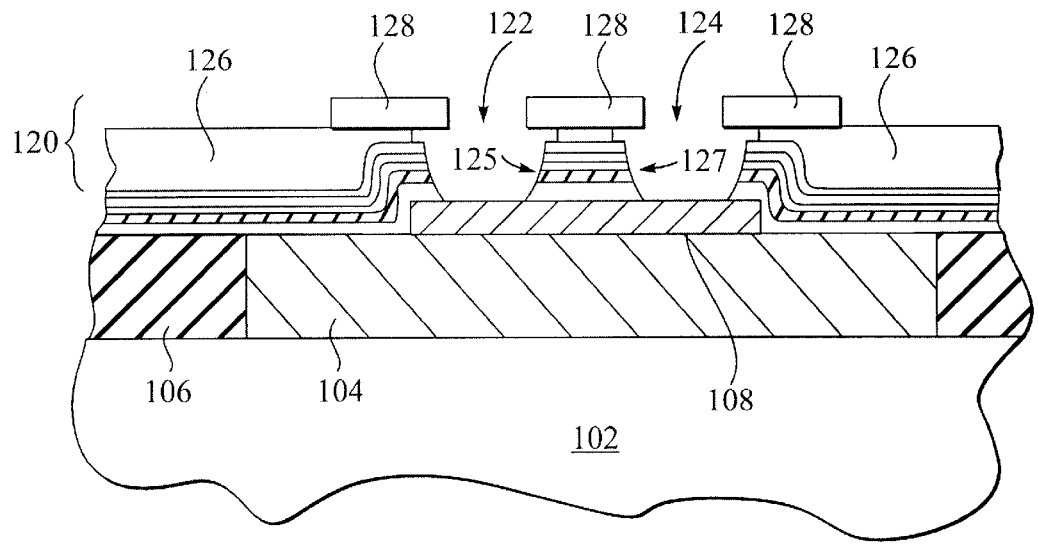

FIGS. 6A and 6B depict a patterned bi-layer photoresist 120, as well as a first via hole 122 and a second via hole 124 which are formed by etching through the patterned bi-layer photoresist 120. This type of bi-layer photoresist configuration aids the removal of the photoresistive material after hard bias material is deposited, as described below. The patterned bi-layer photoresist 120 can be formed by any suitable known method that results in the stepped pattern with undercut shown in FIG. 6B. For example, a first photoresist layer 126 can be deposited over the SDT multilayer 110, over which a second photoresist layer 128 is deposited. Different materials can be chosen for the first photoresist layer 126 and the second photoresist layer 128, such that upon exposure, the two layers react differently and are removed at different rates from each other. With the patterned bi-layer photoresist 120, ion milling forms the first via hole 122 and second via hole 124 through the SDT multilayer 110 to expose the first lead 108. This etching also exposes a first sidewall (or edge) 125 and a second sidewall (or edge) 127 of the SDT multilayer 110 that form portions of the boundaries of first and second via holes 122, 124, respectively. In addition, a width W1 of a portion of FM1 that lies between the first and second via holes 122,124 is defined. Alternatively, an image reversal process can be used to form the first via hole 122 and the second via hole 124. Thus, at this point in the fabrication, from a plan view, the patterned bi-layer photoresist 120 and exposed portions of the first lead 108 can be seen as depicted in FIG. 6A. The remaining portion of FM1 forms a first active layer.

Figure 7A:
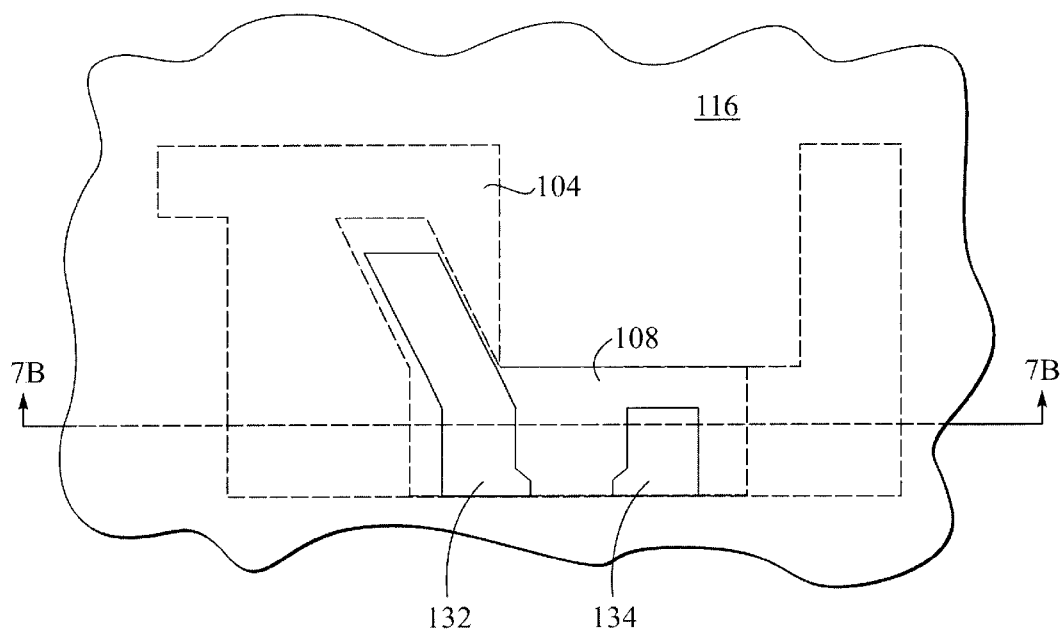
Figure 7B:
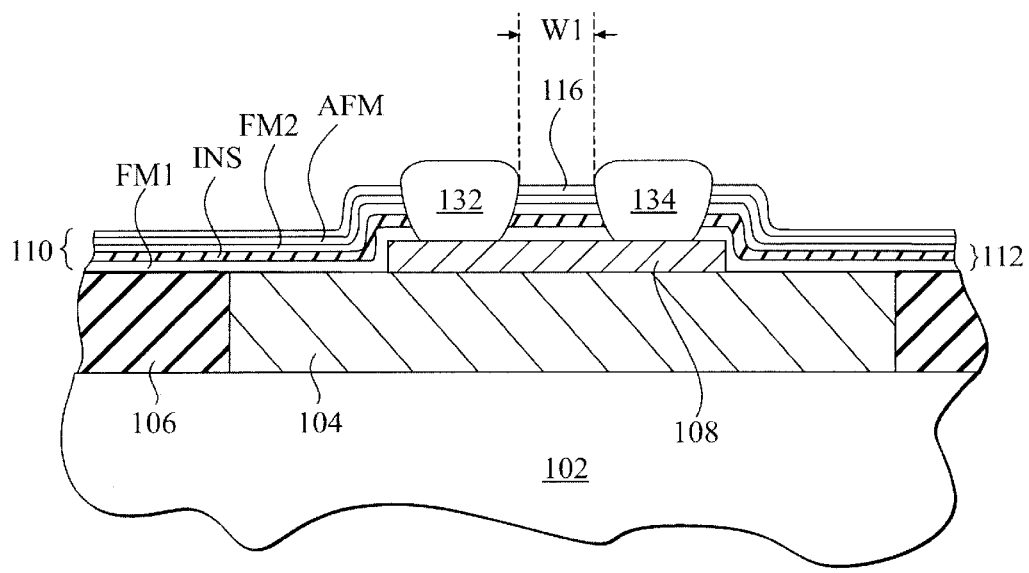

FIGS. 7A and 7B show material deposited into the first via hole 122 and into the second via hole 124 to form a hard bias lead, or connecting lead, 132 and a hard bias 134, respectively. While the patterned bi-layer photoresist 120 is in place during the deposition of the hard bias lead 132 and hard bias 134 material, after this deposition the patterned bi-layer photoresist 120 is removed. Thus, in plan view, as can be seen in FIG. 7A, the top of the STD multilayer 110, or the capping layer 116, can be seen along with the hard bias lead 132 and the hard bias 134. As can be seen in FIG. 7B, the hard bias lead 132 is contiguous with the SDT tri-layer 112 along the first sidewall 125, while the hard bias 134 is contiguous with the SDT tri-layer along the second sidewall 127.

Figure 8A:
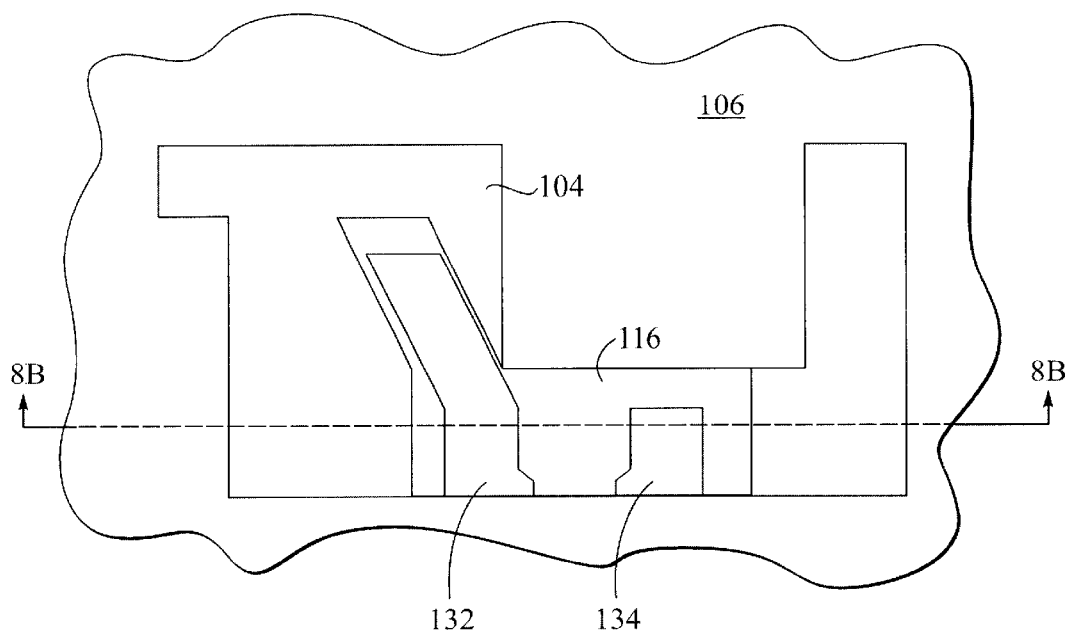
Figure 8B:
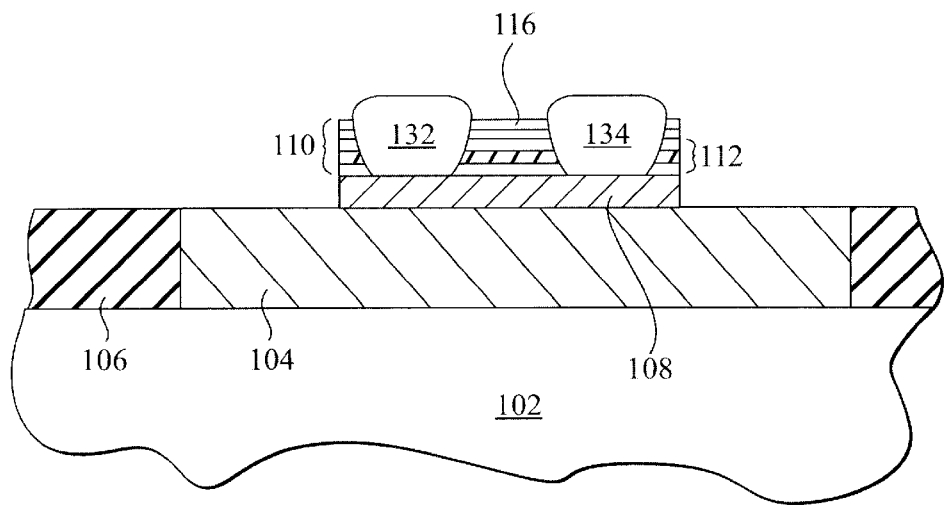

As is shown in FIGS. 8A and 8B, the SDT multilayer 110 is etched, thereby defining a shape of the first ferromagnetic layer FM1. Again, this etching can be performed with known processes such as the use of photoresist that is patterned and then used in conjunction with ion milling. Although not shown in FIG. 8B, other sidewalls of the SDT multilayer are formed during this etching. After the etching and removal of any used photoresist, FIG. 8A shows that in plan view, the hard bias lead 132, the hard bias 134, the upper capping layer of the SDT multilayer 110, the first shield 104, and the planarized undercoat layer 106 can be seen.

Figure 9A:
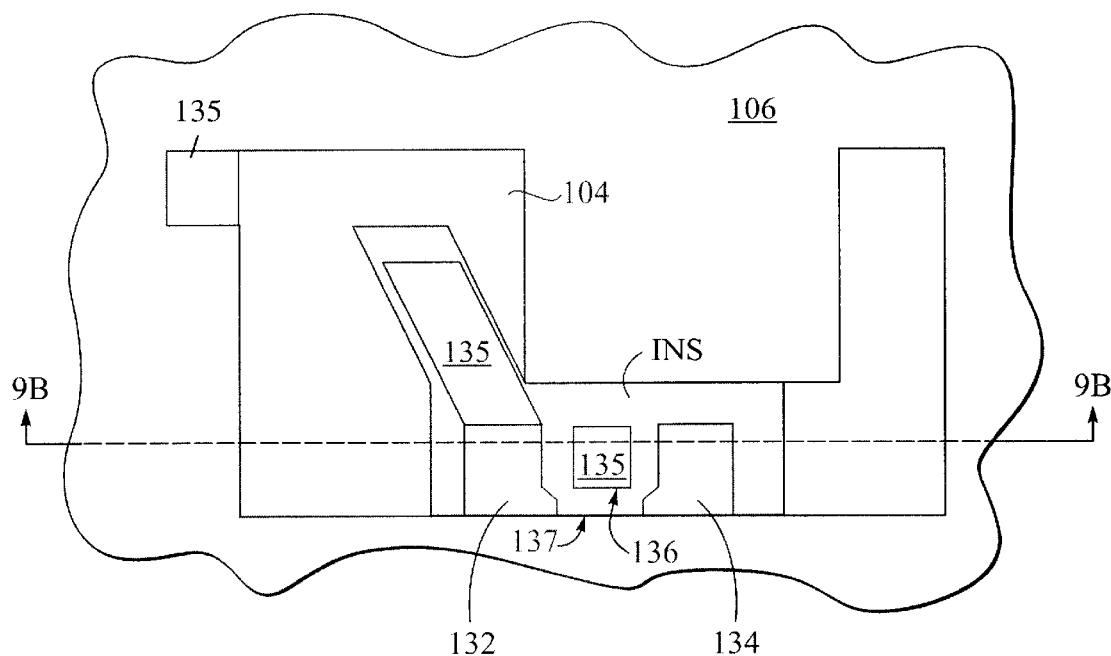
Figure 9B:
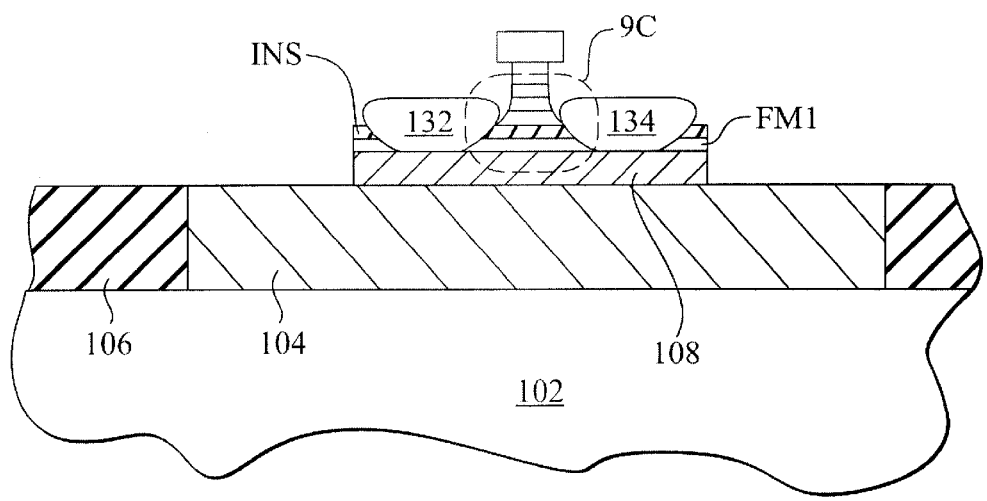

As is depicted in FIGS. 9A and 9B, another bi-layer photoresist 135 is formed over a portion of the SDT multilayer 110, a portion of the hard bias lead 132, and a portion of the first shield 104. With the bi-layer photoresist 135 in place over the SDT multilayer 110, the SDT multilayer 110 is etched, for example by ion milling. By using the bi-layer photoresist 135 over the SDT multilayer 110, or other suitable method, a portion of the SDT multilayer 110 remains intact, while in all other areas, the capping 116, AFM 114, and FM2 layers are removed, exposing the INS layer.

Figure 9C:
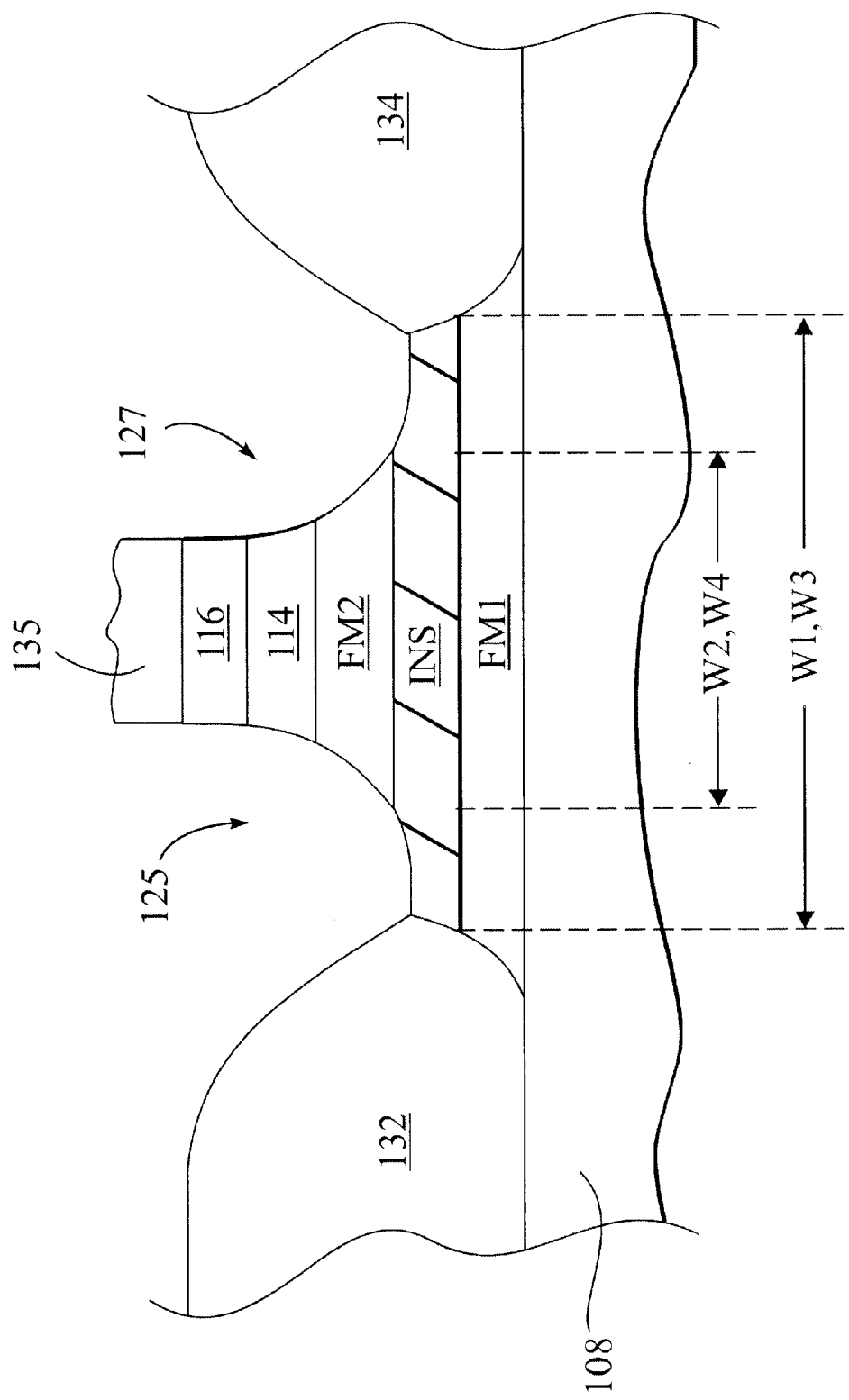
FIG. 9C is an enlarged cross-sectional view of the partially fabricated SDT read sensor of FIG. 9B, according to an embodiment of the present invention.

FIG. 9C is an enlarged view further illustrating the result of this etching in the area of the first and second sidewalls 125 and 127. While the first and second sidewalls 125 and 127 are shown to exemplify the results of the etching, of course similar results are achieved in the areas of the other sidewalls of the SDT multilayer 110 that are not shown in FIG. 9C. Due to the stepped and undercut nature of the bi-layer photoresist 135 formed above the SDT multilayer, portions of the capping, AFM, and ferromagnetic layer FM2 between the first and second sidewalls 125, 127 remain intact, with that portion of FM2 that remains forming a second active layer. As can be seen in FIG. 9A, the second active layer then has a facing (or front) surface (or edge) 136 that lies in a substantially different plane than that of a facing surface 137 of the first active layer. In addition, the etching is halted before etching is accomplished through an entire thickness T of the insulation layer, INS, the remaining portion of which forms an intermediate layer. Thus, because the FM1 layer is not exposed during the etching, there can be substantially no redeposition of etched FM2 material that could connect the FM1 and FM2 layers. In this way, while electric current can pass between the first active layer FM1 and the second active layer FM2 through the intermediate layer INS, the second active layer FM2 is substantially electrically isolated from the first active layer FM1, or, in other words, there is substantially no short circuit path between them.

In a particular embodiment of the present invention, the end point of the etching can be determined by monitoring the milling rate of the SDT layers. Through testing, the milling rates are determined for the particular materials of FM2 and INS that are to be used. From these milling rates, an algorithm can be devised for determining how much longer to etch given particular milling rates observed during fabrication. Thus, during fabrication, the milling rate of the SDT layers is monitored, and milling is stopped based upon the detected milling rate and the empirically devised algorithm. Also, when the materials used in FM2 and INS have significantly different milling rates, as is the case between NiFe and AlN, the change in milling rates is more easily and more quickly recognized, facilitating precise etch end-point detection.

After this etching, which does not extend to the FM1 layer, a first interface surface 140 of FM1 between the first and second sidewalls 125, 127 has a first width W1, while a second interface surface 142 of FM2 between the first and second sidewalls 125, 127 has a second width W2 that is smaller than the first width W1. Further, the INS, or intermediate layer, has a third interface surface 144 with a third width W3 that is substantially equal to the first width W1, and a fourth interface surface 146 with a fourth width W4 that is substantially equal to the second width W2. Of course, alternative etching methods could be used which would etch only part way through the INS layer as described above, but which could result in different relative widths of the above described interface surfaces than those shown in FIG. 9B.

Figure 10A:
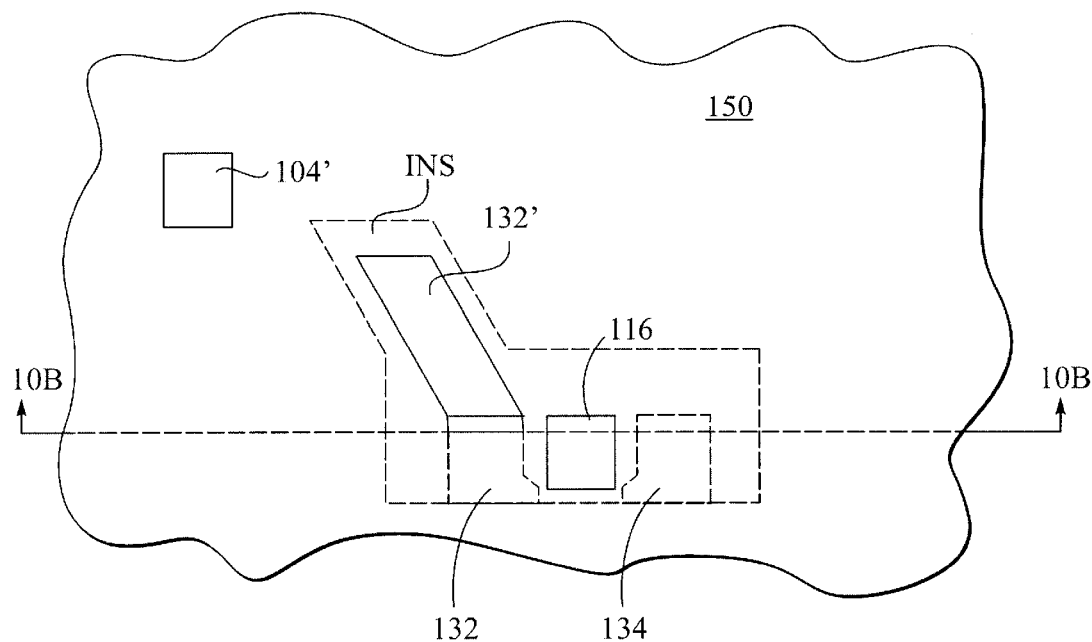
Figure 10B:
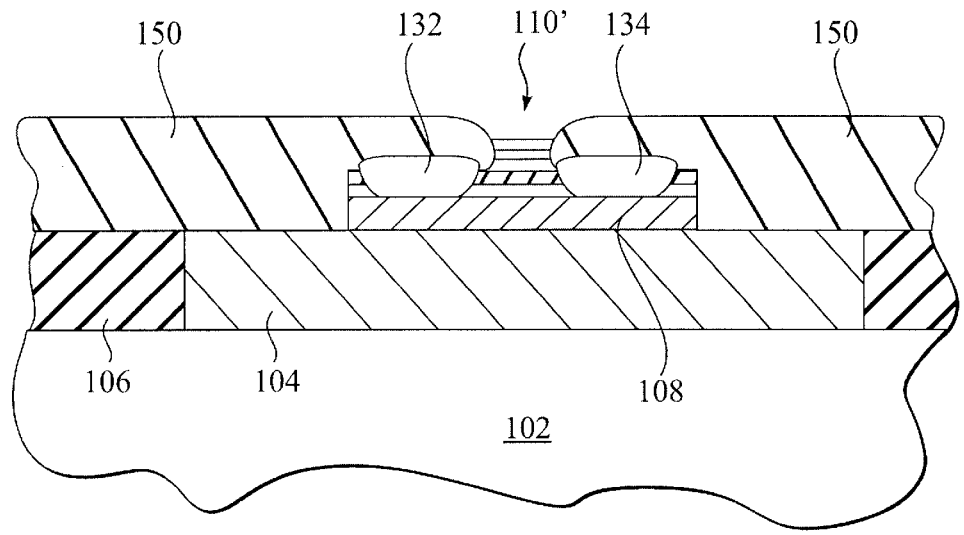
Figure 11A:
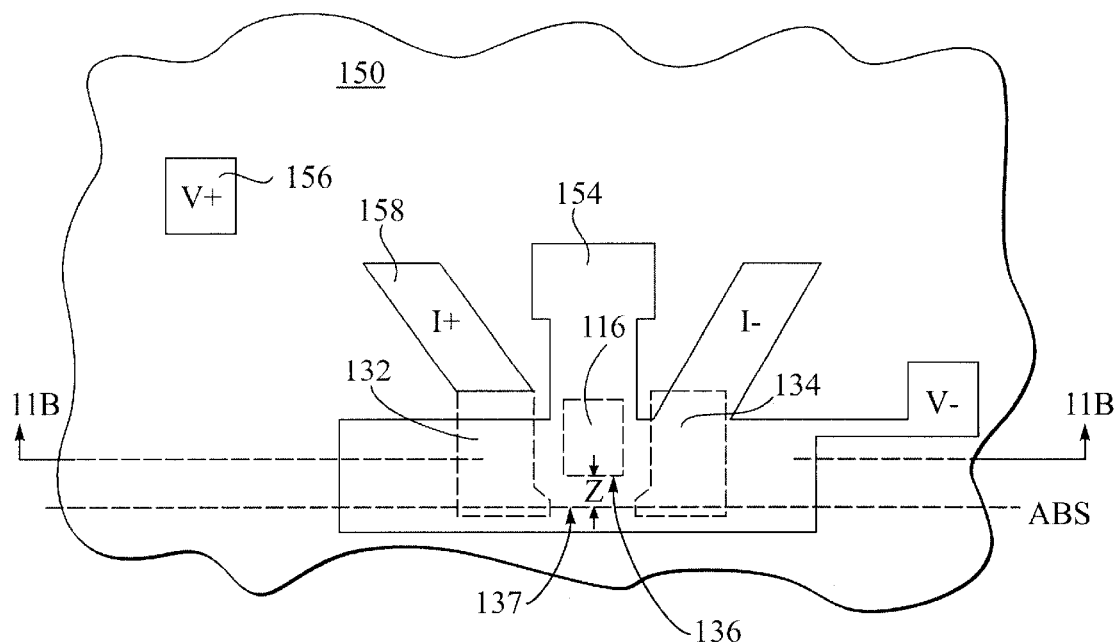
Figure 11B:
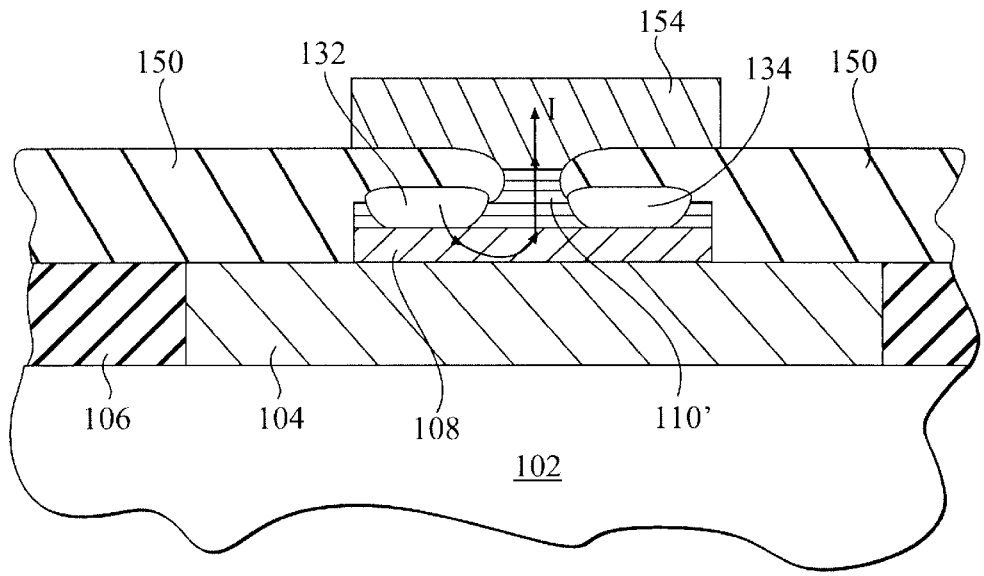

FIGS. 10A and 10B show the addition of an insulation layer 150 deposited over the SDT multilayer 110, the hard bias lead 132, the hard bias 134, the first shield 104, and the insulation layer 106 while the second bi-layer photoresist portions were still in place. After removal of the second bi-layer photoresist, a first shield portion 104', a hard bias lead portion 132', and an SDT multilayer portion 110' are exposed through the insulation layer 150. Thus, as shown in FIGS. 11A and 11B, a second shield 154 can be formed in contact with and overlying the SDT multilayer portion 110'. The second shield 154 is formed of any suitable conductive material and can be formed by first depositing an NiFe seed layer and mask, e.g., a photoplating dam (not shown), after which the second shield 154 is plated. Similarly, and potentially during the same process steps, a first shield via plug 156 and a hard bias lead via plug 158 can be formed. The mask and seed layer are then removed to expose the insulation layer 150.

After additional fabrication forms a write element 34 overlying the SDT multi-layer (not shown), the read/write sensor is lapped to form an air bearing surface ABS that is substantially perpendicular to the SDT layers and substantially parallel to the viewing plane 11B—11B. With appropriate location of the bi-layer photoresist shown in FIG. 9B, and lapping to a correspondingly appropriate plane, the FM2 facing surface 136 can be recessed relative to the ABS (and thereby relative to the first active layer FM1 facing surface 137). In this way, FM2 is not lapped and thus smearing of the FM2 material is avoided during lapping to thereby avoid forming a short circuit between FM1 and FM2. Also, there is no opportunity for corrosion of FM2 through exposure at the ABS. In addition, for appropriate recess distances Z, even though the recessed location of the pinned layer FM2 affects the free layer FM1 magnetization, the corresponding percentage reduction in SDT sensor sensitivity is small. More specifically, although the sensing area is reduced by this recessed design, the intrinsic high resistance and high $\Delta R/R$ of the SDT sensor can compensate for the reduced signal. For example, assuming an SDT $\Delta R/R$ of about 20%, it has been calculated that with Z about 0.2 $\mu$m, the free layer tilts about 7° different than if Z=0, the reduction in sensitivity is less than about 15%. Comparing such performance with an AMR assumed to have a $\Delta R/R$ of about 2%, the recessed design SDT sensor still exhibits significantly greater sensitivity.

Figure 1B:
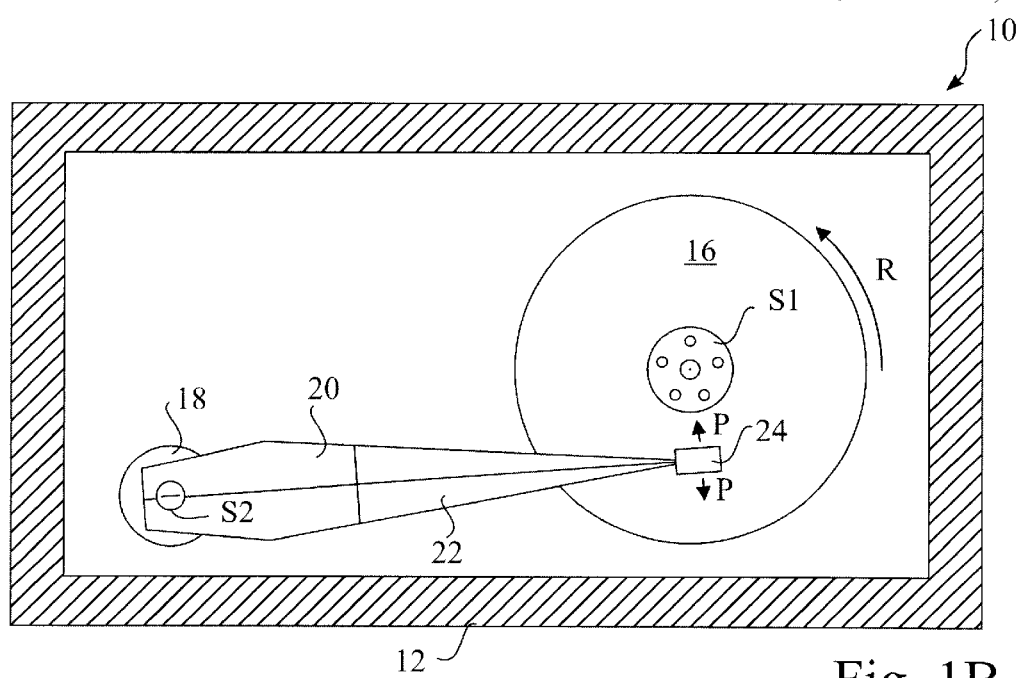
FIG. 1B is a top plan view along line 1B—1B of FIG. 1A.
Figure 1C:
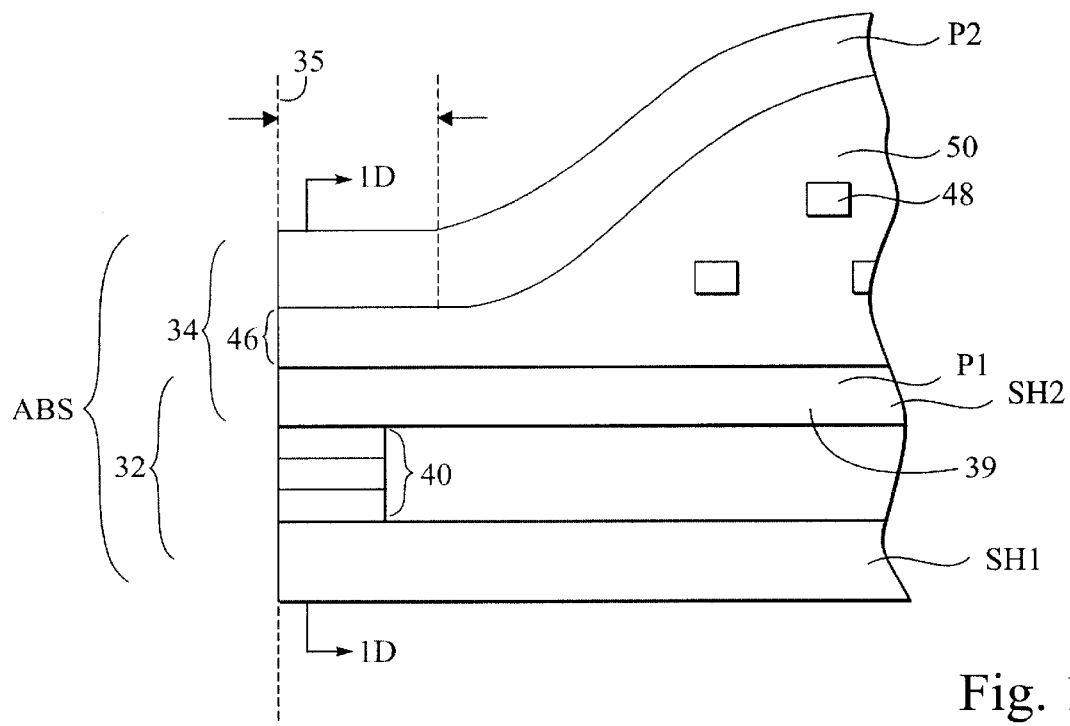
FIG. 1C is a cross-sectional side view of a read-write head incorporating a magnetoresistive effect read sensor.
Figure 1D:
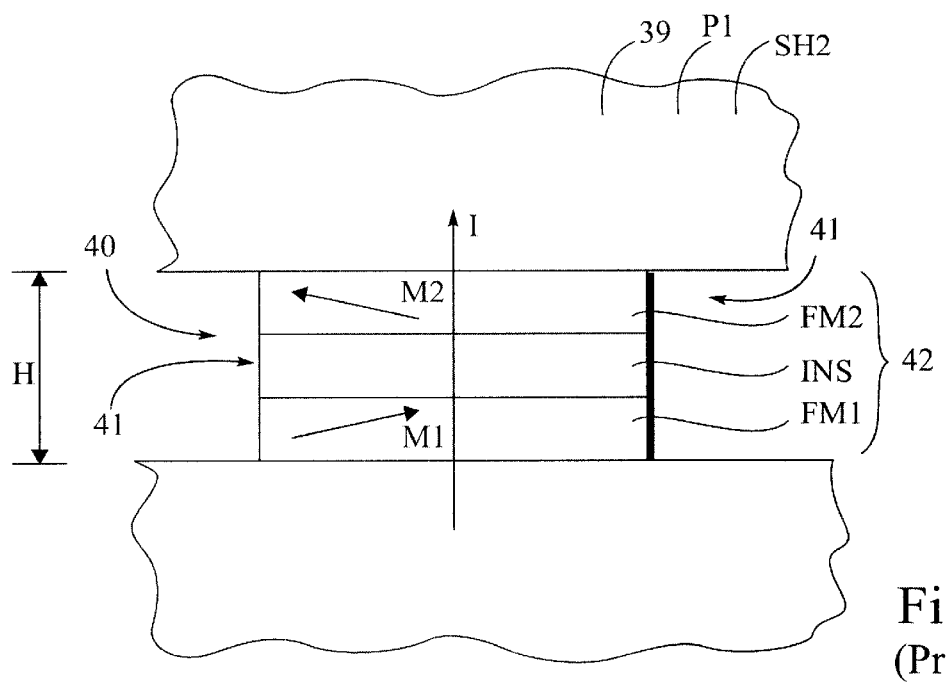
FIG. 1D is a cross-sectional view of the read element of FIG. 1C.

The SDT read/write sensor thus fabricated, then can be incorporated with a suspension system that can support the read/write head for movement over a surface of a magnetic media, and a disk drive motor that has a drive spindle upon which such a magnetic media is supported for rotation as illustrated in FIGS. 1A and 1B. With appropriate wiring, a sensing current I can be introduced to the SDT layers via hard bias lead via plug 158, the hard bias lead 132, and the first lead 108, as can be understood with reference to FIGS. 11A and 11B. The sensing current circuit continues to the second shield 154 after passing through the SDT layers. While the sensing current is applied, the voltage difference between the first shield, via appropriate wiring to the first shield via plug 156, and the second shield 154 can be monitored to determine the resistive response of the read sensor during operation.

While embodiments of the present invention have been described in the context of an SDT read sensor, it should be understood that the present invention can also be practiced in the context of other types of CPP read sensors that can benefit from substantially avoiding short circuits between parallel layers that overlie one another.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A tri-layer magnetoresistive effect sensor, comprising:
   a first active layer having a first interface surface defined by a first width;
   a second active layer substantially electrically isolated from said first active layer, having a second interface surface defined by a second width that is smaller than said first width;
   an intermediate layer located between said first active layer and said second active layer, said intermediate layer having a third interface surface that is proximate said first interface surface and that is defined by a third width that is substantially equal to said first width, and having a fourth interface surface that is proximate said second interface surface and that is defined by a fourth width that is substantially equal to said second width; and
   first and second sidewalls continuously bounding said first active layer, said second active layer, and said intermediate layer.

2. A tri-layer magnetoresistive effect sensor as recited in claim 1, wherein said first active layer has a first facing surface that provides an air bearing surface substantially perpendicular to said first and second active layers, and wherein said second active layer has a second facing surface that lies in a different plane than said air bearing surface.

3. A tri-layer magnetoresistive effect sensor as recited in claim 2, wherein said first active layer and said second active layer are ferromagnetic, and said intermediate layer is formed of an electrically insulating material, such that a spin-dependent tunneling phenomenon can occur through said intermediate layer when a current is caused to flow between said first active layer and said second active layer.

4. A system for reading from and writing to magnetic media, said system comprising:
   a read/write head including
      a write element for writing data to said magnetic media, and
      a tri-layer magnetoresistive effect sensor coupled with said write element and including
         a first active layer having a first interface surface defined by a first width;
         a second active layer substantially electrically isolated from said first active layer, having a second interface surface defined by a second width that is smaller than said first width, and an intermediate layer located between said first active layer and said second active layer, said intermediate layer having a third interface surface that is proximate said first interface surface and that is defined by a third width that is substantially equal to said first width, and having a fourth interface surface that is proximate said second interface surface and that is defined by a fourth width that is substantially equal to said second width, and first and second sidewalls continuously bounding said first active layer, said second active layer, and said intermediate layer.

5. The system as recited in claim 4, further comprising:

a disk drive motor having a drive spindle upon which said magnetic media is supported for rotation; and a suspension system supporting said read/write head for movement over a surface of said magnetic media.

6. The system as recited in claim 4, wherein said first active layer and said second active layer are ferromagnetic and said intermediate layer is formed of an electrically insulating material.

* * * * *